(12) United States Patent
Forster

(10) Patent No.: US 6,581,542 B1
(45) Date of Patent: Jun. 24, 2003

(54) DEVICE FOR VERIFYING THE STATE OF MAMMALS

(76) Inventor: Martin Forster, Gerwigstrasse 25, D-78234 Engen (DE)

( * ) Notice: Subject to any disclaimer, the term of this patent is extended or adjusted under 35 U.S.C. 154(b) by 0 days.

(21) Appl. No.: 09/936,591

(22) PCT Filed: Mar. 8, 2000

(86) PCT No.: PCT/EP00/02000

§ 371 (c)(1),
(2), (4) Date: Sep. 14, 2001

(87) PCT Pub. No.: WO00/54576

PCT Pub. Date: Sep. 21, 2000

(30) Foreign Application Priority Data

Mar. 17, 1999 (DE) .......................... 199 12 026
Oct. 27, 1999 (DE) .......................... 199 51 690
Dec. 17, 1999 (DE) .......................... 199 60 943

(51) Int. Cl.⁷ .................................. A01K 9/00
(52) U.S. Cl. ................. 119/71; 119/51.02; 215/11.2
(58) Field of Search ............... 119/71, 14.02, 119/51.02; 215/11.1, 11.2; 606/235

(56) References Cited

U.S. PATENT DOCUMENTS 3,644,302 A * 2/1972 Wienert ...................... 528/378
3,790,016 A * 2/1974 Kron .......................... 215/11.1
5,211,479 A * 5/1993 Coffey et al. ................ 374/151
5,355,833 A * 10/1994 Legrain .................... 119/51.02
5,366,481 A * 11/1994 Zade .......................... 606/234
5,534,013 A * 7/1996 Zeindler ..................... 374/151
5,551,374 A * 9/1996 Wells ........................ 119/57.92
5,611,622 A * 3/1997 Wang .......................... 374/151
5,743,648 A * 4/1998 Zeindler ..................... 215/11.2
5,853,005 A * 12/1998 Scanlon ...................... 29/235.5

FOREIGN PATENT DOCUMENTS

| DE | 19710342 A | * 9/1998 | ............ A01K/9/00 |
| DE | 19901587 A1 | * 7/2000 | ............ A01K/9/00 |
| RU | 2098951 C1 | * 12/1997 | ............ A01K/9/00 |
| WO | WO 97/15185 | * 5/1997 | ............ A01K/5/02 |

* cited by examiner

Primary Examiner—Michael J. Carone
Assistant Examiner—Son T. Nguyen
(74) Attorney, Agent, or Firm—Bachman & LaPointe, P.C.

(57) ABSTRACT

The invention relates to a device for verifying the state, especially the state of health, of mammals, especially agricultural working animals, which suckle from a teat. Run-out sensors for determining values, such as resistivity measurements, temperature values of the animal and/or the foodstuff, pH determination, gas measurements from the pharynx and stomach, are allocated to the teat.

13 Claims, 3 Drawing Sheets

DEVICE FOR VERIFYING THE STATE OF MAMMALS

BACKGROUND OF THE INVENTION

The invention relates to a device for monitoring the state, in particular the state of health, of mammals, in particular useful farm animals, which suck on a teat.

For example, in modern calf breeding it is imperative that the condition of the breeding animals is determined continuously. DE 197 10 342.1, for example, discloses a device and a method for the automatic registration of the body temperature of useful farm animals, with an alarm function, a temperature sensor being integrated into the teat of the milk drinking trough.

In practice, however, various difficulties have arisen in this case. Firstly, the temperature sensors are bitten by the animals, for which reason they have to be safely protected without the measured values or the measuring times being impaired. In many cases, the animals do not always take the teat and therefore the temperature sensor completely into the mouth either, so that the measured results are falsified here, too. Falsification of the measured results also occurs because of the drinking-trough medium itself and because of entrained air. If, for example, the milk is very warm, the temperature of the milk is determined, but not the body temperature of the animal.

In many cases, the times for reliable measurements are also too short.

Accordingly, it is the principle object of the invention to provide a device of the aforementioned type by means of which the overall condition of the suckling mammal can be determined.

SUMMARY OF THE INVENTION

The foregoing object is achieved by assigning the teat of a suckling mammal to extendable sensors for determining values such as conductivity measurement, temperature values of animal and/or foodstuff, pH determination, gas measurement from gullet, stomachs.

In the stomachs of calves, digestion takes place, for example, as a result of which gas, for example methane and ketoses, are produced. A determination of these gases permits conclusions to be drawn about the state of health of the animal.

In order that measurements of this type can be made, the sensors should be located on automatically extendable, endoscope-like probes which, during suckling, can be inserted into the mouth cavity, and even into the gullet and into the stomach.

In a simpler exemplary embodiment it is also possible to equip part of the device as a breath extractor hood which is fitted with gas extraction elements, via which the breath from the animal can be fed to a measuring device. Even the breath on its own, with the gas contained in the breath, permits conclusions to be drawn about the state of health of the animal.

When monitoring the condition of a mammal, it appears to be important in principle that the teat does not differ too much in terms of its temperature from the body temperature of the mammal. In the event of too high a difference, otherwise measured results could be falsified by a certain temperature shock. For this reason, provision is made, according to the present invention, for the teat to be at least partly heated.

A further important part of the present invention relates to determining the body temperature of the suckling mammal. From the body temperature, conclusions can be drawn about the condition of the mammal, in particular whether it has a fever, is exposed to stress situations or the like.

DE-197 10 342.1 A1 has already disclosed the practice of assigning temperature sensors to the teat. In the preferred exemplary embodiment, both a device for heating the teat and at least one temperature sensor are integrated in the teat. By means of the two devices, the temperature of the teat is preferably brought to a temperature which is slightly below the body temperature of the mammal. If, for example, the body temperature is 40° C, then the teat temperature should be about 38.5° C. This avoids the teat being heated to the temperature of the mammal only when the latter is drinking, if at all, which takes some time. By means of the present method according to the invention, the temperature sensor is able to react better and more accurately even to slight temperature differences.

In a preferred exemplary embodiment, the foodstuff, in particular the milk, is also to be reheated in the area of the teat. This can be carried out in the automatic drinking machine, upstream of the suckling point or in the suckling point itself. It would be desirable to set the milk temperature likewise to a temperature slightly below the body temperature of the mammal since, as a result, no fluctuations occur in or on the teat which cannot be attributed to the body temperature of the mammal.

In a further exemplary embodiment, the temperature sensors can be arranged at a greater distance from the actual teat part, in order that the determination of the temperature is not falsified by the temperature of the drinking medium. For this purpose, the obvious course is to provide the teat with a broadened base part, the base part being configured from high-strength material. By means of this broadened base part, the entrainment of air is prevented.

The configuration of the teat from, preferably, two parts, namely the broadened base part and an actual teat part plugged into the broadened base part, permits the actual teat part, which is configured to be softer than the base part, can be designed to be interchangeable. By this means, costs can be saved.

In order that the animals preferably take the teat completely into the mouth, and the ambient air does not cool down the temperature sensors too severely, the base part is preferably also preheated. In this case, the preheating temperature is also slightly below the body temperature here, so that during suckling the body temperature of the animal is reached more quickly and more reliably at the temperature sensors. By this means, the measurement times are shortened and more usable measurements are achieved.

If the animal takes the teat into the mouth entirely, the tip of the teat also conducts the drinking medium into the gullet at the same time, so that the temperature of the drink does not impair the measured results. In addition, thought is given to interrupting or restricting the supply of drink during the measurement operations.

Otherwise, it is preferable for a plurality of probes and sensors to be provided at various points of the teat. Therefore, erroneous measurements resulting from drink and/or air taken in are avoided, in conjunction with appropriate data evaluation.

In addition, it has proven to be advantageous in the present invention to insert the sensors, heating devices, temperature sensors or the like into the teat only after or during the uptake of foodstuff by the animal from the teat, in order that the animal is not distracted from suckling by the components correspondingly inserted. The fact that the animal begins to take up food at a conventional teat, until the foodstuff is taken into the mouth by the animal, means that it is distracted by drinking. Only then, for example automatically, are the sensors, temperature sensors, heating elements or the like inserted into or beside the teat in order to determine the corresponding values.

The heating elements used can be, for example, electrical, in particular resilient, elements. However, it has also proven to be advantageous to insert flexible tubes or the like with a heated medium, for example water, into the teat, in order to heat the latter or in particular an area of the temperature sensor.

In the process, heating ducts, chambers or the like, for example, can be cast into the wall of the teat, through which a heated medium flows, for example. In addition, thought is also to be given to acting on the teat from outside, in particular applying heat externally, such as by means of radiant heaters, hot air or the like. This is likewise intended to lie within the scope of the present invention.

The present invention is suitable in particular at suckling points on automatic drinking machines and any desired drinking devices, on water drinking troughs for cold and warm water and liquids with any desired additives, but also as a device for play and to work off the requirement to drink.

BRIEF DESCRIPTION OF THE DRAWINGS

Further advantages, features and details of the invention emerge from the following description of preferred exemplary embodiments and with reference to the drawing, in which.

DETAILED DESCRIPTION

Figure 1A:
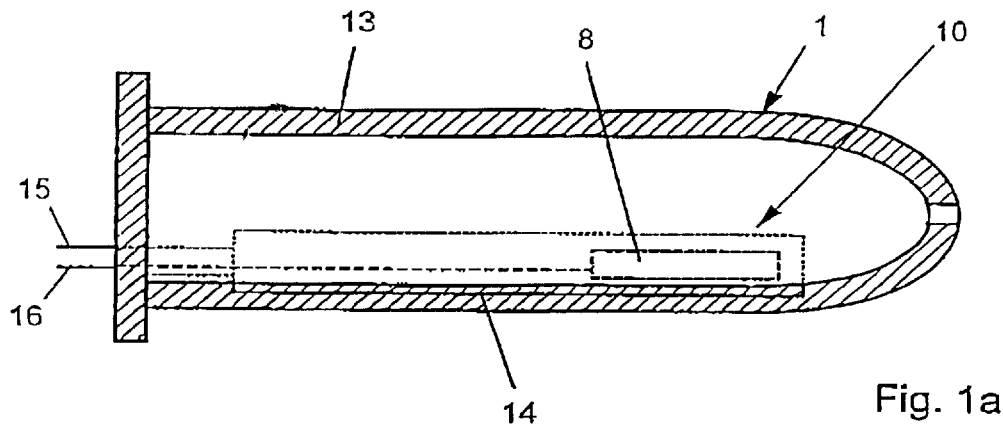
FIG. 1a shows a longitudinal section through a teat according to the invention.

FIG. 1a illustrates a conventional teat 1. In one wall 13 of the teat 1 there is a heating element 14 which, shown dashed, is of shell-like design. In addition, a temperature sensor 8 is provided in the wall 13 of the teat 1.

Via the heating element 14, the teat 1 is preheated to a temperature which is preferably slightly below the body temperature of the mammal. Via the temperature sensor 8, the temperature of the teat 1 is determined before, during and after the suckling of the mammal, it being possible for conclusions about the condition of the mammal to be drawn from the temperature differences.

The heating element 14 is connected via a line 15 to an appropriate power source. The temperature sensor 8 has a connection 16 to a corresponding unit which accepts the values from the temperature sensor 8.

Figure 1B:
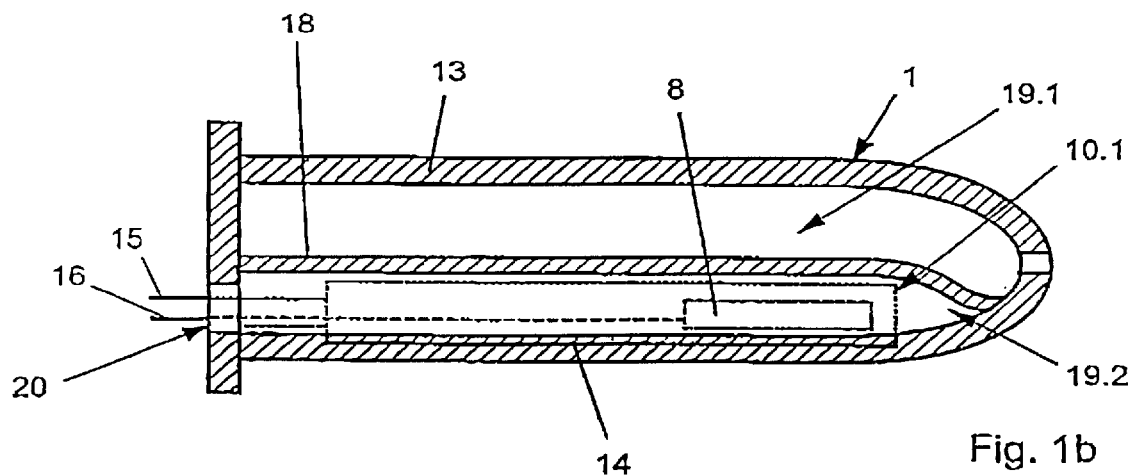
FIG. 1b shows a longitudinal section through the teat according to FIG. 1a with a dividing wall.
Figure 1C:
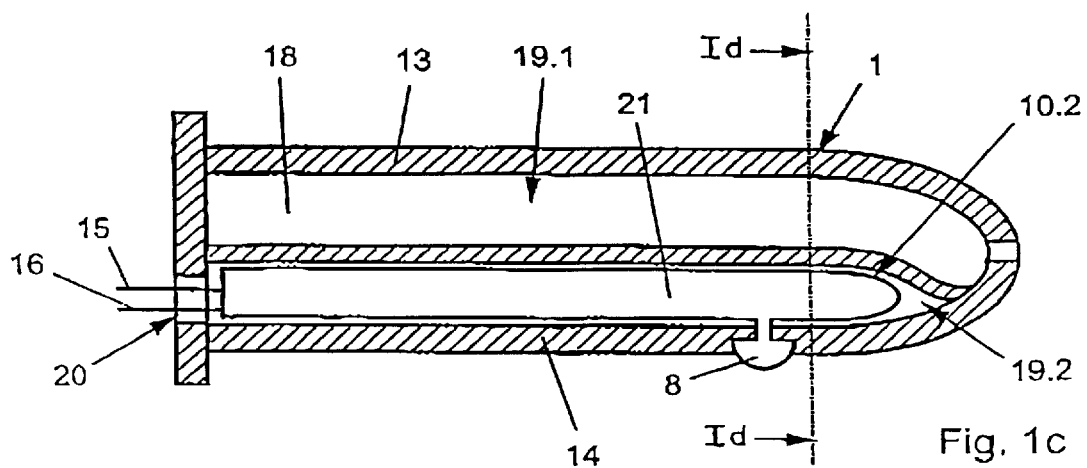
FIG. 1c shows a longitudinal section through the teat according to FIGS. 1a and 1b with an inserted sleeve element as a sensor.
Figure 1E:
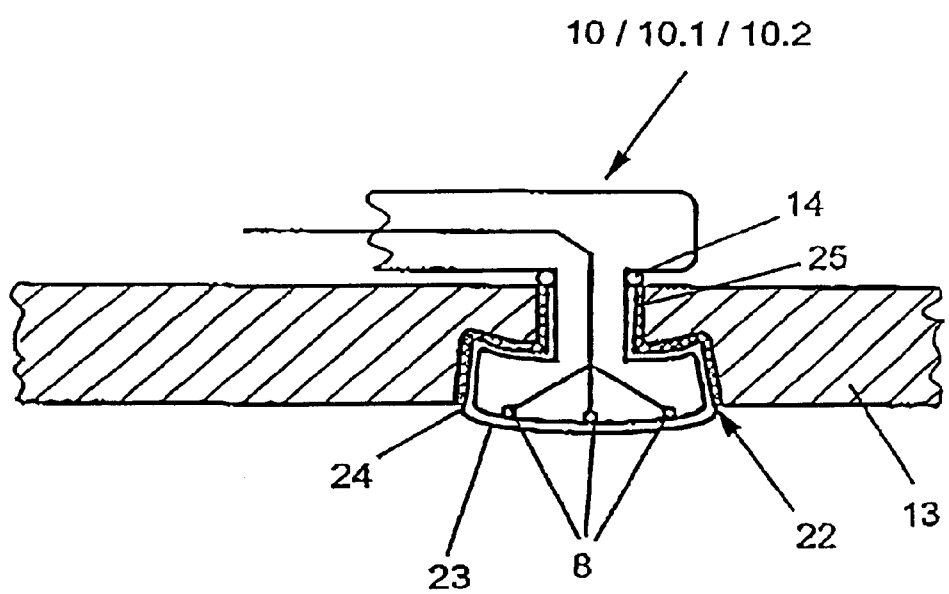
FIG. 1e shows a partial longitudinal section through a sensor in the area of one wall of the teat.
Figure 2:
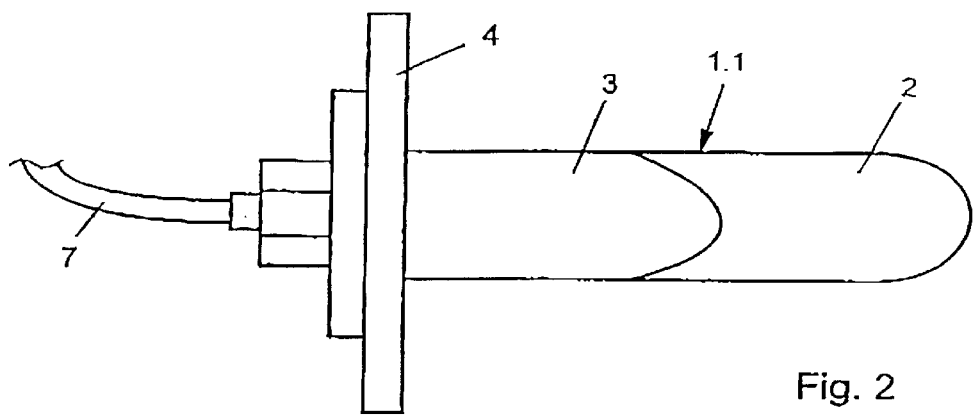
FIG. 2 shows a side view of a device according to the invention for monitoring the condition of mammals.
Figure 3:
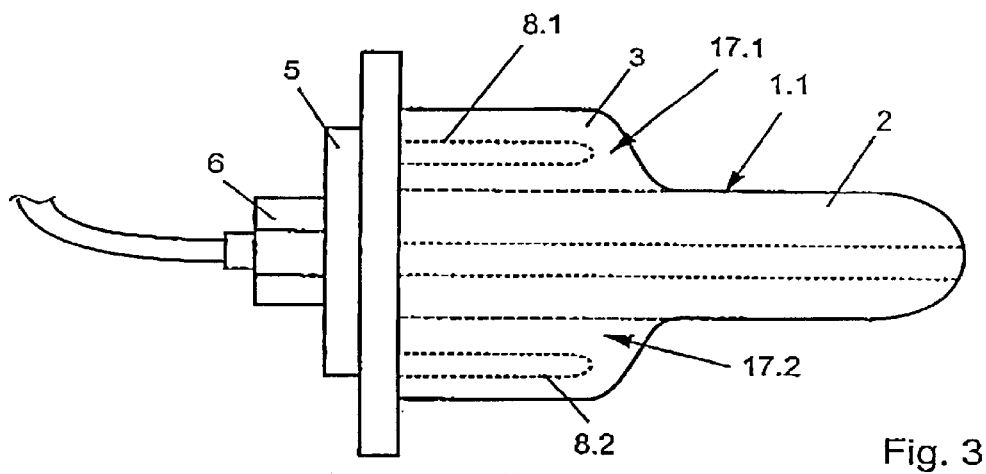
FIG. 3 shows a plan view of the device according to FIG. 2.

A device according to the invention for monitoring the condition of mammals according to FIGS. 2 and 3 has a teat 1.1, which comprises a teat part 2 and a base part 3. The base part 3 is of flat design and broadened with respect to the teat part 2. It may have lateral channels 17.1, 17.2, into which the corresponding temperature sensors 8.1, 8.2, but also sensors 10.1, 10.2, can be inserted (see FIGS. 1b, 1c and 1e).

The teat 1.1 is preferably inserted into a retaining plate 4 and is retained on the latter by a washer 5 and a nut 6 at the rear. 7 indicates a feed line for milk, for example.

According to FIG. 1b, the teat 1 is subdivided by means of a dividing wall 18 into a first chamber 19.1 and a second chamber 19.2. The foodstuff flows through the first chamber 19.1, and through the second chamber 19.2, a sensor 10.1, if appropriate with a temperature sensor 8, can be inserted through the opening 20 at the end, and can therefore be replaced again.

The chambers 19.1, 19.2 are completely separated from each other by the dividing wall 18, so that no foodstuff can flow into the area of the sensor 10.1. The latter is protected against foodstuffs.

Figure 1D:
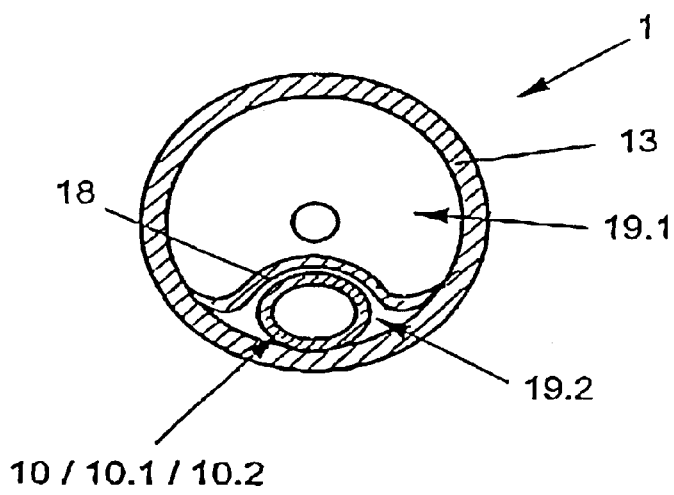
FIG. 1d shows a cross section through the teat according to FIG. 1c along the line Id—Id.

In order to prevent the formation of cheese and residues in the chamber 19.1, the dividing wall 18, as also indicated in the cross-sectional illustration in FIG. 1d, is formed at the end so as to promote flow in the edge regions, so that no residues of foodstuff or remainders of foodstuff remain in the chamber 19.1.

It has proven to be particularly advantageous to insert the sensor 10.1 into the chamber 19.2 so that it can be detached again or replaced, so that in the event of damage to the teat 1 and/or the sensor 10, 10.1, 10.2, these components can be replaced and do not have to be substituted completely. In this case, the sensor 10.1 can likewise be assigned a heating element 14 in the manner described above.

In a further exemplary embodiment for the present invention according to FIG. 1c, the sensor 10.2 is of sleeve-like design, as a sleeve element 21, which if appropriate can be heated by means of heating elements 14. This sleeve element 21 can be inserted into the teat 1, in particular into its chamber 19.2, through the opening in the manner described above.

A special feature of the sleeve element 21 is, as indicated in particular in FIG. 1e, that a projection 24 reaches through an accommodation opening 22 in the wall 13 of the teat 1, in order that a preferably highly conductive surface 23 projects out of the teat 1.

This is used for the exact measurement and registration of the temperature of the animal as it takes up food. In this case, the projection 24 can have a plurality of temperature sensors 8, distributed on the surface 23, in order to register a temperature change and, in particular, also the temperature of the animal at the teat 1 exactly and quickly.

In addition, the sensor 10.1, 10.2, in particular the projection 24, can be assigned the heating element 14, in order to preheat the temperature approximately to the temperature of the animal, so that the registration of the temperature can be carried out more quickly and more exactly.

In order that no temperature losses can occur, the projection 24 in the wall 13 can be provided with insulation 25.

It has also proven to be advantageous to design the surface 23 of the projection 24 to be curved in the manner of a lens, so that the risk of injury is minimized and, nevertheless, good contact and contact-making, in particular good transmission of temperature, is ensured. Furthermore, it is advantageous in the present invention for the projection knob, which engages with an exact fit in a corresponding accommodation opening 22 provided with an offset and, in this way, retains the sensor 10, 10.1, 10.2 with respect to the wall 13.

At the same time, as shown in FIGS. 1b and 1c, the sensor 10, 10.1, 10.2 is firmly clamped and retained in the chamber 19.2 by the dividing wall 18.

By means of the projection 24, in addition, the sensor 10, 10.1, 10.2 is retained in a centered manner and, in addition, is secured against slipping out of the teat 1, in particular the wall 13.

The scope of the present invention is also intended to include providing a plurality of such projections 24, distributed on the surface 23, in particular the wall 13 of the teat 1, in order to register a temperature measurement or change quickly.

According to FIG. 3, temperature sensors 8.1 and 8.2, which are indicated only dashed, are located in the broadened base part 3.

In the present exemplary embodiment, it is not possible to see that the teat part 2 and the base part 3 can be two separate elements, the teat part 2 being replaceable.

Figure 4:
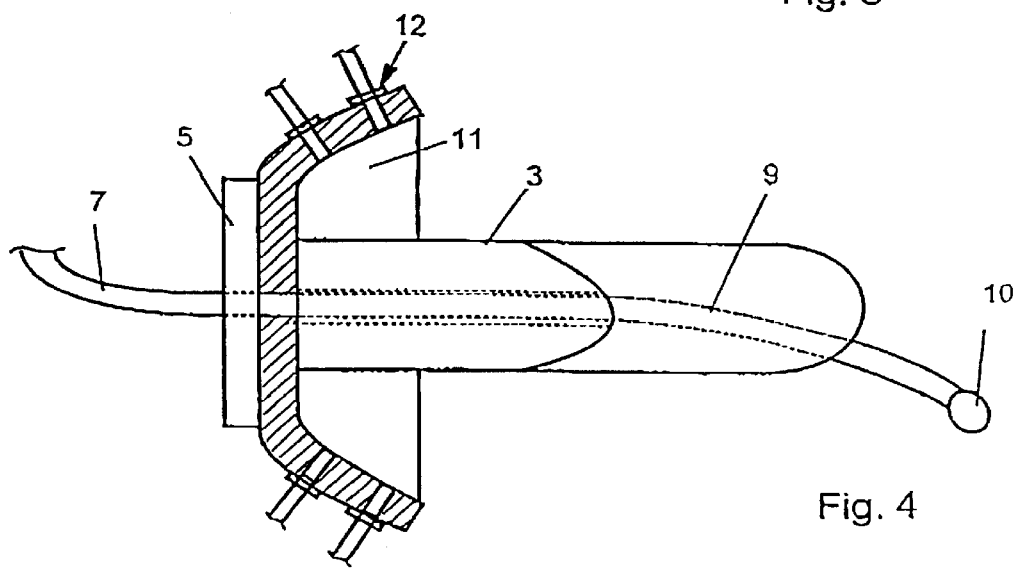
FIG. 4 shows a side view of a further exemplary embodiment of a device for monitoring the condition of mammals.

In the exemplary embodiment of the device according to the invention shown in FIG. 4, instead of the temperature sensors 8.1, 8.2, probes 9 which can be extended like an endoscope are inserted into the base part 3 and have sensors 10 at their tip. By using these sensors 10, various values in the mouth cavity, in the gullet and in the stomach can be determined. These are primarily gas values or else conductivity measurements or pH measurements.

In addition, in this exemplary embodiment the retaining plate 4 is configured as a breath extractor hood 11. This breath extractor hood 11 is fitted with gas extraction elements 12, so that the breath or gases from the stomachs of the animal can be determined during suckling.

What is claimed is:

1. A method of monitoring the condition of a mammal which sucks on a teat comprising the steps of:
    associating a sensor with a teat of a mammal;
    associating with the teat a device for heating the teat;
    determining a current temperature of the teat;
    determining the current body temperature of the mammal;
    comparing the current temperature of the teat to the current body temperature of the mammal to determine a difference;
    comparing the difference between the teat temperature and the body temperature of the mammal to a threshold value; and
    adjusting the teat temperature to a lower temperature difference from the measured body temperature of the animal.

2. The method as claimed in claim 1, wherein the teat temperature is kept close to the body temperature of the mammal or regulated by heating.

3. A method of monitoring the condition of a mammal which sucks on a teat comprising inserting a sensor into the teat of an animal after the animal has begun to suck on the teat and only after or during the uptake of foodstuff by the animal.

4. A device for monitoring the condition of a mammal which sucks on a teat comprising:
    means associated with the teat of a mammal for sensing the current temperature of the teat; and
    heating means associated with the teat for heating the teat in response to the sensed current temperature.

5. A device according to claim 4, further including means associated with the body of the mammal for sensing the current body temperature, means for comparing the difference between the sensed current teat temperature and the sensed current body temperature with a threshold value, and means for adjusting the temperature of the teat based on the comparison.

6. The device as claimed in claim 5, wherein a dividing wall subdivides the teat into two chambers.

7. The device as claimed in claim 6, wherein a foodstuff flows through one chamber, and the temperature sensing means is located into the other chamber wherein the heating means is retained within the chamber by the dividing wall.

8. The device as claimed in claim 6, wherein the chamber is subdivided from the chamber, and the dividing wall is designed to promote flow, in particular at the end and in lateral areas.

9. The device as claimed in claim 5, wherein the temperature sensing means is inserted into the chamber in a retractable manner, as a sleeve element.

10. The device as claimed in claim 5, wherein at least part of temperature sensing means is inserted into an accommodation opening in a wall of the teat and retained there, the temperature sensing means includes a highly conductive surface serving to register the temperature.

11. The device as claimed in claim 10, wherein the temperature sensing means is provided with a projection, which engages into the accommodation opening in the wall, and the temperature sensing means has at least one temperature sensor close to the highly conductive surface.

12. The device as claimed in claim 11, wherein the projection includes the means for at least heating element.

13. The device as claimed in claim 11, wherein the projection is at least partly provided with insulation in the area of the wall.

* * * * *